United States Patent [19]

Khoobiar

[11] 3,761,516

[45] Sept. 25, 1973

[54] PROCESS FOR PRODUCING UNSATURATED ACIDS FROM THE CORRESPONDING UNSATURATED ALDEHYDES

[75] Inventor: Sargis Khoobiar, Clifton, N.J.

[73] Assignee: Halcon International, Inc., New York, N.Y.

[22] Filed: Sept. 28, 1971

[21] Appl. No.: 184,588

[52] U.S. Cl. .............................. 260/530 N, 252/437
[51] Int. Cl. ...................... C07c 57/04, C07c 51/32
[58] Field of Search ................................ 260/530 N

[56]  References Cited
FOREIGN PATENTS OR APPLICATIONS

| 7,014,587 | 4/1971 | Netherlands | 260/530 N |
| 1,007,405 | 10/1965 | Great Britain | 260/530 N |
| 1,032,261 | 6/1966 | Great Britain | 260/530 N |
| 1,084,143 | 9/1967 | Great Britain | 260/530 N |
| 1,174,958 | 12/1969 | Great Britain | 260/530 N |

Primary Examiner—Lorraine A. Weinberger
Assistant Examiner—Richard D. Kelly
Attorney—William C. Long et al.

[57] ABSTRACT

A catalyst useful for the oxidation of unsaturated aldehydes, particularly the oxidation of acrolein and methacrolein, to produce the corresponding unsaturated acids, comprises the combination of molybdenum, phosphorus and arsenic on a support or carrier which is characterized by external macro pores. A preferred form of the catalyst further includes a promoter which is aluminum, copper or cobalt.

10 Claims, No Drawings

PROCESS FOR PRODUCING UNSATURATED ACIDS FROM THE CORRESPONDING UNSATURATED ALDEHYDES

This invention relates to catalysts and is more particularly concerned with catalysts for the vapor phase oxidation of unsaturated lower aliphatic aldehydes to the corresponding unsaturated acids of the same number of carbon atoms, and to a process for using such catalysts. The catalysts and process of this invention are particularly useful in the oxidation of acrolein or methacrolein to acrylic acid and methacrylic acids, respectively.

Unsaturated acids, such as acrylic acid and methacrylic acid, have been produced by the vapor-phase oxidation of the corresponding unsaturated aldehydes in the presence of an oxidation catalyst. It is, of course, desired that the catalyst exhibit effective activity and that it be characterized by high selectivity toward the desired product acids and, to this end, various catalysts have been proposed which are based on different combinations of several components. Unfortunately, however, those catalysts which tend to give the more attractive results generally involve components which are relatively expensive, such as noble metals. Catalysts of this character are disclosed, for example, in Netherlands published applications Nos. 6911762 and 6911763.

It is accordingly an object of this invention to provide an improved catalyst which is highly effective in the production of unsaturated acids by the vapor-phase oxidation of unsaturated aldehydes but which does not require the use of noble metals or like expensive components.

It is another object of this invention to provide an improved process for the vapor-phase oxidation of monoethylenically unsaturated aldehydes, such as acrolein and methacrolein, to acrylic acid and methacrylic acid, respectively.

It is a further object of this invention to provide a method for making the novel and improved catalyst of the character indicated.

Other objects of the invention will be readily apparent from the description thereof which follows.

In accordance with the present invention, an improved catalyst for use in oxidizing unsaturated aldehydes in the vapor phase to their corresponding unsaturated acids comprises the combination of molybdenum, phosphorus and arsenic, these components being present in the catalyst in predetermined relative atomic proportions. Effective results are observed when the catalyst is based solely upon these three elements but, from the standpoint of optimum benefits and catalyst effectiveness, it is preferred that a promoter or promoters be incorporated in the catalyst and, for this purpose, aluminum, copper and/or cobalt have been found to enhance the activity of the basic catalyst system.

In the active catalyst composition of the invention, all of the components mentioned are believed to be predominantly in the form of oxides, e.g. $MoO_3$, $P_2O_5$, $As_2O_3$, $Al_2O_3$, $Co_2O_3$, and $CuO$, since the catalyst is advantageously prepared by means of techniques which involve "activation" by a prolonged heat treatment, i.e. calcination, as a concluding step. However, it is convenient to refer to the proportions of the various components in terms of the several elemental relationships. In this way, the catalyst of the invention can be characterized by its analytical composition in which the components are expressed in meaningful terms without regard to the exact chemical composition or form in which they may actually exist. Thus, basing the proportions on a molar quantity of molybdenum as 1.0, the phosphorus is present in the range of 0.04 to 0.5 mol, preferably 0.06 to 0.17 mol, and most desirably 0.08 to 0.1 mol, and the arsenic is present in the range of 0.02 to 1.0 mol, preferably 0.04 to 0.17 mol, and most desirably 0.08 to 0.1 mol. When promoters are used, each may be used in amounts up to 0.5 mol per mol of molybdenum, preferably in amounts which are at least 0.01 mol per mol of molybdenum.

In accordance with the invention, the above-name catalytic components of the catalyst are supported upon a carrier, in the form of refractory inorganic particles, which is characterized as having external macro pores, i.e. the carrier particles have an outer shell containing very large pores having a diameter of about 1 micron to about 500 microns, these pores comprising at least 50 percent of the pore volume in the outer shell, said pores extending inwardly from the surface for a distance up to about 500 microns, and 10 to 90 percent of the exterior surface of the carrier particles being composed of such pores. Preferably, the pores have a diameter of about 10 microns to about 250 microns and they preferably represent 20 to 60 percent of the carrier particle exterior surface. In addition, the carrier has a surface area of at most 2 square meters per gram, e.g. 0.005 to 2 square meters per gram, preferably 0.01 to 1 square meter per gram, and most desirably 0.02 to 0.5 square meter per gram. The particle size of the carrier is adapted to the particular form of process in which the catalyst is to be used, e.g. in a fixed bed process in which the catalyst is used in the form of granules or pellets, or in a moving bed process. Generally suitable are particles having an average diameter of about three thirty-seconds to one-fourth inch although larger or smaller particle sizes can also be employed.

The weight of catalyst mixture relative to the support or carrier may be in the range of 5 to 50 percent, preferably about 10 to about 30 percent, and most desirably 15 to 25 percent, based on the weight of the support. The invention in its broadest sense is not limited to a particular carrier or support material, and supports having these characteristics formed from various refractory support materials such as alumina, silicon carbide, silica, titania, zirconia, fuller's earth, pumice, asbestos, kieselguhr, and the like, can be used. However, especially good results are obtained by the use of an alumina support which has these characteristics, particularly one containing 10–20 percent silica ($SiO_2$), and such support materials are preferred. The support may be in the form of pellets, lumps, granules, spheres, rings or other formed pieces, or in other forms which may be of regular or irregular contour.

The support is readily made by conventional techniques in the catalyst support art, e.g. by mixing finely divided alumina or other support material with a flux, such as a clay, and forming a paste, extruding the paste and subdividing the extruded shape to the desired extent, followed by impressing small particles of a combustible material, such as sawdust, e.g. of a size corresponding to the desired pore size, into the outer shell of the carrier, and then calcining, e.g. at 1,200° to 1,800°F. It will be apparent, however, that other known techniques can be employed to provide a support having the specified characteristics.

The catalyst of the invention can be prepared in a number of ways, e.g. using conventional techniques in accordance with which the catalyst-forming components are dissolved in appropriate solvents and are then deposited from solution onto the support or carrier. To prepare the catalyst the several components can be introduced into solution in the form of various salts or other compounds of convenient types and no specific form for the catalyst precursors is necessary. Preferably, however, the molybdenum is employed in the +6 state, e.g. as molybdic oxide, ammonium molybdate, phosphomolybdic acid, silicomolybdic acid, and the like. However, molybdenum in other valence states can also be used. Arsenic is suitably employed as the +3 oxide, but other compounds such as ammonium ortho arsenate and arsenic pentoxide are also suitable. Phosphorus is preferably employed in the +6 state, e.g. as phosphoric acid, ammonium phosphate, phosphomolybdic acid and its salts, and the like. In any case, the several components are employed in a form which is liquid in itself, or which is soluble in water or in an acid, so that all of the components can be deposited in fluid form upon the support or carrier. Arsenic oxide, for example, can be dissolved in nitric acid, ammonium molybdate can be dissolved in water, and orthophosphoric acid is soluble in ammonium hydroxide. Promoters, when used, are most suitably incorporated in the catalyst formulation as decomposable salts, e.g. the nitrates of aluminum, copper and cobalt, which dissolve in the liquid coating solution.

While all of the components of a particular formulation can be mixed together in a single solution in which the carrier is immersed, preferably, and for best results, the molybdenum compound and the arsenic compound, suitably in acid solution, are applied in a first step to the carrier and the coating is thereupon dried, and then the phosphorus compound, and any promoters, suitably in ammonia solution, are applied to the coated carrier and dried. The coated carrier particles are, following the one-step or two-step coating procedure, then suitably activated by calcining them in a kiln or oven, or in a tube through which air is passed, at an elevated temperature (e.g. 300°–400°C., preferably 325°–400°C) for at least four hours. Care should be taken not to employ temperatures substantially above 450°C. since excessive temperatures tend to deactivate the catalyst. Especially good results are obtained when the phosphorus component is added as an ammonium salt, e.g. by dissolving phosphoric acid in ammonium hydroxide, and it has been found that a certain residual ammonia value remains in the catalyst even after activation and prolonged use, which appears to have a favorable effect upon selectivity. On the other hand, it is preferred to introduce the molybdenum component in a nitric acid solution since it has been observed that increased activity is realized when this procedure is followed, possibly due to the presence of residual nitric acid following activation and even after prolonged use. In any case, the two step procedure discussed above, wherein the molybdenum component and the arsenic component are first applied to the carrier, followed by the phosphorus component, surprisingly provides improved results from the standpoint of activity and selectivity.

When the catalyst of this invention is used in the vapor-phase oxidation of aldehydes to form the corresponding unsaturated acids, the oxidation conditions employed are those generally associated with this reaction. Thus, the reaction in which the catalysts of this invention are of particular utility and in which they provide high conversions and exhibit high activity, notwithstanding their relatively inexpensive nature, involves contacting the appropriate aldehydes in the vapor phase in generally low concentration with the catalyst and oxygen. Once reaction is begun, it is self-sustaining because of its exothermic nature. A variety of reactors will be found to be useful and multiple tube heat exchanger type reactors are quite satisfactory, and the process can be carried out in conventional equipment commonly employed for reactions of this type.

The gaseous feed to the reactor contains a low concentration of unsaturated aldehyde, and oxygen. Suitably, an inert gas, such as nitrogen, is also present. The oxygen is usually added in the form of air or as air enriched with oxygen. As mentioned, conventional oxidation conditions can be employed but, for best results, the aldehyde is generally present in concentrations of about 1 to 20 volume percent of the total feed with a preferred range of about 3 to 15 volume percent and an especially preferred range of 5 to 10 volume percent, and the corresponding ranges for oxygen are 2 to 20.5 volume percent, 5 to 17 volume percent and 8 to 14 volume percent, the balance being the inert gas or gases.

The temperature of the reaction at the center of the reactor should, for best results, be within the range of from about 275° to 400°C., preferably 280°–375°C. and the optimum temperature range is 305° to 360°C. Because the reaction is exothermic, means for conducting the heat away from the reactor are normally employed. The temperature may be controlled by conventional methods such as by the use of reactors surrounded by a salt bath.

The flow rate of the gaseous stream through the reactor may be varied within rather wide limits, but a particularly suitable space velocity ($hr^{-1}$) is about 100 to 5,000 and more preferably about 200 to about 2,000, especially about 500 to about 1,500.

The pressure on the reactor is not generally critical, and the reaction may be conducted at atmospheric, superatmospheric or subatmospheric pressure. Preferably, however, pressures of 2–300 psia, preferably 10–100 psia, and most preferably 15–75 psia are employed.

The catalyst and the processes of the present invention are useful for the production of unsaturated aliphatic acids by oxidation with molecular oxygen of unsaturated lower aliphatic aldehydes generally. The preferred starting materials are the monoethylenically unsaturated aliphatic monoaldehydes of from three to six carbon atoms such as acrolein, crotonaldehyde, methacrolein, 2-methyl-2-butenal, 2-methyl-2-pentenal, and the like. Best results have been obtained with acrolein and methacrolein. Mixtures of aldehydes may be used. If desired, the reactor effluent may be recycled to the reactor for increased yields.

The unsaturated acid product may be recovered by a number of ways well known to those skilled in the art. For example, the acid may be condensed, or scrubbed with water, or other suitable solvents, followed by separation of the unsaturated acid product.

The unsaturated acid products of this invention have many well known commercial uses, particularly as monomers for polymer formation or in the formation of esters such as methyl methacrylate.

The features of the invention will be more readily apparent from the following specific examples of typical application. It will be understood, however, that these examples are for the purpose of illustration only and are not to be interpreted as limiting the invention.

EXAMPLE I

In 100 ml 30% $HNO_3$ is dissolved 2.5 g. $As_2O_3$ by heating to 100°–110°C. (Solution A), and 53 g. ammonium heptamolybdate is dissolved in 250 ml distilled water (Solution B). Solution B is added to 102 g. of spheres of an alumina carrier previously placed in a rotary dryer. The carrier is of three-sixteenths inch particle size and is composed of about 87 wt. % $Al_2O_3$ and 12 wt. % $SiO_2$ (the balance being miscellaneous impurities), with a surface area of about 0.03 square meter per gram, and is characterized by external macro pores as defined above with about 30 percent of its exterior surface composed of such external macro pores which have diameters in the range of 10 to 250 microns. Mixing of the carrier particles with Solution B is effected for 5–10 minutes. Heat is applied until the temperature of the mixture reaches 50°C. and Solution A, while still at about 100°C., is then added to the mixture and heating is continued to dryness and until the catalyst temperature reaches 260°C.

A Solution C is formed by dissolving 2.95 g. 85 percent ortho phosphoric acid in 150 ml 10 percent ammonium hydroxide. Solution C is then added to the dry catalyst product described in the preceding paragraph and the mixture is evaporated to dryness in a rotary dryer, with heating being continued until the catalyst temperature reaches 260°C. The thus prepared catalyst is then placed in a muffle furnance at 350°C. for 14 hours. The final catalyst comprises 72.1 wt. percent support and 27.9 wt. percent supported components which are present in the mol ratios Mo/As/P = 12/1/1.

A quantity (100 cc) of this catalyst is placed in a ½ inch × 40 inch stainless steel pipe defining an isothermal reactor. A feed mixture containing 5.9 vol. percent methacrolein, 13 vol. percent oxygen, and the balance nitrogen, is passed over this catalyst at an average space velocity of about 520 $hr^{-1}$ and at a temperature of about 330°C. After 85 hours of reaction, analysis of the reaction effluent shows that the catalyst effects a conversion of about 34% with a selectivity of about 91 percent. In the foregoing, % Conversion = (Mols Aldehyde Converted/Mols Aldehyde in Feed) × 100

% Selectivity = (Mols Acid Produced/Mols Aldehyde Converted) × 100

EXAMPLE II

In a comparative experiment, a catalyst is prepared as described in Example I, except that the support is an alumina (84.7% $Al_2O_3$, 13.4% $SiO_2$), of three-sixteenths inch particle size having internal macro pores, i.e. large pores extending to the center of the particles, and a surface area of about 0.03. This catalyst (100 cc) is placed in the reactor described in Example I and a feed mixture containing 8.9 vol. percent methacrolein, 13 vol. percent oxygen, and the balance nitrogen, is passed over the catalyst at an average space velocity of about 567 $hr^{-1}$, and at a temperature of about 360°C. After reaction for 28 hours, analysis of the reaction effluent shows that the catalyst effects a conversion of only 15 percent with a selectivity of only 56 percent.

EXAMPLE III

A catalyst is prepared as described in Example I, using a support characterized by external macro pores as set forth in Example I, except that the support is formed from silicon carbide (approx. 78% SiC, 15% $SiO_2$, 6% $Al_2O_3$). It is of three-sixteenths inch diameter particle size and has a surface area of 0.03. This catalyst (100 cc) is placed in the reactor described in Example I and a feed mixture containing about 4.5 vol. percent methacrolein, 13 vol. percent oxygen, and the balance nitrogen, is passed over the catalyst at average space velocity of about 490 $hr^{-1}$, and at a temperature of 333°–350°C. The reaction is continued for 34 hours. Analysis of the reaction effluent shows that the catalyst effects a conversion of about 40 percent with a selectivity of about 80 percent.

EXAMPLE IV

The catalyst preparation procedure of Example I is repeated except that 3.64 g. of $Co(NO_3)\cdot 6H_2O$ is mixed with Solution C before coating of the carrier particles. The finished catalyst comprises 78.5 wt. percent support and 21.5 wt. percent supported components which are present in the mol ratios Mo/As/P/Co = 12/1/1/1. This catalyst is placed in the reactor described in Example I and a feed mixture containing 5.1 vol. percent methacrolein, 13 vol. percent oxygen and the balance nitrogen, is passed over the catalyst at an average space velocity of about 500 $hr^{-1}$, and at a temperature of about 328°C. for 44 hours. Analysis of the reaction effluent shows that the catalyst effects a conversion of about 35 percent with a selectivity of about 90%.

EXAMPLE V

The catalyst preparation procedure of Example I is repeated except that 0.94 g. of $Al(NO_3)_3\cdot 9H_2O$ as a solution in 10 ml $H_2O$ is mixed with Solution A before coating of the carrier particles. The finished catalyst comprises 76.7 wt. percent support and 23.3 wt. percent supported components which are present in the mol ratios Mo/As/P/Al = 12/1/1/0.1. This catalyst is placed in the reactor described in Example I and a feed mixture containing about 5.3 vol. percent methacrolein, 13 percent oxygen and the balance nitrogen, is passed over the catalyst at an average space velocity of about 570 $hr^{-1}$, and at a temperature of about 328°C. for 53 hours. Analysis of the reaction effluent shows that the catalyst effects a conversion of about 52 percent with a selectivity of about 87 percent.

The embodiments of the invention in which an exclusive property is claimed are defined as follows:

1. A process for the preparation of an unsaturated acid which comprises oxidizing the corresponding monoethylenically unsaturated monoaldehyde of from 3 to 6 carbon atoms in the vapor-phase with molecular oxygen in the presence of a non-noble metal catalyst composition consisting essentially of oxides of molybdenum arsenic, and phosphorus and optionally a promoter selected from the group consisting essentially of aluminum, copper and cobalt disposed upon a support characterized by external macro pores and having a surface area of at most 2 square meters per gram, said pores having a diameter of about 1 micron to about 500 microns.

2. A process as defined in claim 1, wherein said catalyst contains a promoter which is selected from the group consisting essentially of aluminum, copper or cobalt.

3. A process as defined in claim 1, wherein the catalyst carrier is an alumina.

4. A process as defined in claim 1, wherein the unsaturated aldehyde is acrolein or methacrolein.

5. A process as defined in claim 1, wherein the arsenic is present in the amount of 0.02 to 1 mol and the phosphorus is present in the amount of 0.04 to 0.5 mol based on 1 mol of molybdenum.

6. A process for the preparation of methacrylic acid, which comprises oxidizing methacrolein in the vapor-phase with molecular oxygen in the presence of a nonnoble metal catalyst consisting essentially of oxides of molybdenum, arsenic, and phosphorus and optionally a promoter selected from the group consisting essentially of aluminum, copper and cobalt disposed upon a support characterized by external macro pores having a diameter of about 1 micron to about 500 microns and having a surface area of at most 2 square meters per gram.

7. A process for the preparation of an unsaturated acid which comprises oxidizing acrolein or methacrolein in the vapor phase with molecular oxygen in the presence of a catalyst composition consisting essentially of molybdenum, arsenic, and phosphorus and optionally a promoter selected from the group consisting essentially of aluminum, copper and cobalt, wherein the proportions per molar quantity of molybdenum are 0.04 to 0.5 mol phosphorus, and 0.02 to 1.0 mol arsenic, disposed upon a support characterized by external macro pores and having a surface area of at most 2 square meters per gram, said pores having a diameter of about 1 micron to about 500 microns and extending inwardly from the surface of the support particles for a distance up to about 500 microns, with 10 to 90 percent of the external surface of the support particles being composed of such pores.

8. A process as defined in claim 7, wherein the catalyst contains a promoter which is selected from the group consisting essentially of aluminum, copper or cobalt.

9. A process as defined in claim 7, wherein the aldehyde reactant is methacrolein and the promoter is aluminum.

10. A process as defined in claim 6, wherein the promoter is aluminum.

* * * * *